United States Patent [19]

Lennartsson

[11] Patent Number: 5,392,421
[45] Date of Patent: Feb. 21, 1995

[54] SYSTEM FOR SYNCHRONIZING CLOCKS BETWEEN COMMUNICATION UNITS BY USING DATA FROM A SYNCHRONIZATION MESSAGE WHICH COMPETES WITH OTHER MESSAGES FOR TRANSFERS OVER A COMMON COMMUNICATION CHANNEL

[76] Inventor: Kent Lennartsson, Kvaser Consultant AB, Box 4076, S 511 04 Kinna, Sweden

[21] Appl. No.: 773,876
[22] PCT Filed: Apr. 20, 1990
[86] PCT No.: PCT/SE90/00264
  § 371 Date: Oct. 25, 1991
  § 102(e) Date: Oct. 25, 1991
[87] PCT Pub. No.: WO90/13078
  PCT Pub. Date: Nov. 1, 1990

[30] Foreign Application Priority Data

Apr. 25, 1989 [SE] Sweden ............... 8901495-5

[51] Int. Cl.⁶ .................................. G06F 1/12
[52] U.S. Cl. .................. 395/550; 364/DIG. 1; 364/271; 364/271.2; 375/107
[58] Field of Search .......... 395/550, 775, 800; 375/107; 340/825.14

[56] References Cited

U.S. PATENT DOCUMENTS 4,584,643 4/1986 Halpern et al. ............ 364/200
4,890,222 12/1989 Kirk ........................... 364/200

FOREIGN PATENT DOCUMENTS 2000564 1/1970 Germany .
2127594A 9/1982 United Kingdom .

OTHER PUBLICATIONS

Patent Abstracts of Japan, vol. 10, No. 86, p. 443, Abstract of JP 60-222915, publ. 1985 Nov. 7 Fujitsu K.K.
IBM Technical Disclosure Bulletin, vol. 31, No. 6, Nov. 1988: "Distributed Clock Control and Synchronization," pp. 53 and 56.
IBM Technical Disclosure Bulletin, vol. 31, No. 7, Dec. 1988: "Synchronization of Remote Microcontrollers," pp. 71-72.

*Primary Examiner*—Thomas C. Lee
*Assistant Examiner*—Fran R. Faller
*Attorney, Agent, or Firm*—Pollock, Vande Sande & Priddy

[57] ABSTRACT

In an arrangement for synchronizing data and other information in a computerized system which comprises a common serial data communication channel (212), two or several collaborating units (201) are arranged connectable to the channel, wherein a respective unit comprises a clock (207). A main clock is included in the system and the clock in one of the units can be used as main clock. The units with associated communication element and communication channel are arranged in such a manner that the time of the main clock can be transferred to the clocks of the other units. The clocks are arranged so that they can operate with a common time base. The units/communication elements comprise hard- and software or hardware which brings about the setting of a respective clock with predetermined accuracy in dependence on the main clock time.

18 Claims, 4 Drawing Sheets

SYSTEM FOR SYNCHRONIZING CLOCKS BETWEEN COMMUNICATION UNITS BY USING DATA FROM A SYNCHRONIZATION MESSAGE WHICH COMPETES WITH OTHER MESSAGES FOR TRANSFERS OVER A COMMON COMMUNICATION CHANNEL

BACKGROUND OF THE INVENTION

In certain applications it is important that the time of reception of a data. item is known. For example, this applies to open- and closed-loop control engineering where measurement data are used for controlling a process. The older a data item is, the worse it is as control data. In most cases, data can be processed quickly and effectively in the computer so that the delay becomes so small that it does not need to be considered. In these systems, it can be said that the data is provided with its time determination by the fact that the system is built up with a time delay which is so small that it can be neglected. In a system which works asynchronously with a data communication system, these transfer times can become long and undetermined in their length. Moreover, it is no longer a question of exact transfer times, but the transfer normally occurs with a certain time probability and with a certain spread based on what loading there is on the communication system and possibly what priority the message has. It is possible to organize the system with strict rules so that the transfer times are guaranteed. But this requires a well developed management which operates through all connected units. One of the reasons that a data communication system is used is to cut down on management, which is why this is a poor solution. Moreover, any reconfigurations require great expenditures. The best way to avoid management is to ensure that all units take into consideration the fact that the data comes randomly in time. For the units to be able to take into consideration variations in time, the receiving unit must know when the data is received in time or how much time the transfer of the data took. Moreover, if the position of the data in time is known, the receiving unit can check that the data has arrived within the arranged time frame. In the construction of a control system, it can be difficult to estimate and/or simulate all possible time delays, but these unexceptable delays can be detected with the aid of time information. At present it is uncommon for the position in time of the data to be included in process control, even in a system with a common clock where this is simple to carry out.

Time uncertainty is not unique to communication systems but also applies internally in a computer, for example a program can read an A/D converter every time it receives an interrupt. If this interrupt does not have the highest priority or a program has disabled the interrupt, it can take a certain time from the arrival of the data to when the data is processed in some program sequence. For this to function with a high accuracy, the data must be accompanied by the time when the data was received. In this way, the subsequent processing program can take into consideration the time of the data arrival. When different clocks are used, these must be synchronized so well that the error between them does not cause any problem for the program sequences which use the time as reference.

There are at least two reasons for ensuring the data position in time before it is processed. A better value than that which has been obtained can be extrapolated from earlier data through calculations. This extrapolation requires that the position in time for the given data is known for the calculation to have good accuracy. The program which will deal with the data can check that it has been received within the correct time. In the case where the data is old, new data can be requested, and in the worst case an error message can be given and/or the process terminated.

To obtain the time in a computer system, a resonant circuit constructed of coils and/or capacitors and/or crystals is used. Crystals are most common since they provide the best accuracy. With a crystal, a stable frequency is obtained which normally has an accuracy between ±25 and ±2000 ppm of the desired fundamental frequency. The error in the fundamental frequency occurs partly due to geometrical errors in the making of the crystal and errors which occur with varying temperature. These pulses can be counted with a definite frequency with the aid of a counter circuit and a reading of this counter directly provides a time. When the time is to be used, it will normally be specified in terms of seconds so that it is understandable to a person. This raises a problem since in many cases the fundamental frequency of the crystal is not such that the number in the counter directly provides the time in seconds, which is why some form of scaling of the number must be carried out.

Irrespective of the type of time indication, the same type unit must apply to all units which are coupled to a system in which the synchronization of an instant in time is to be possible. The simplest way to solve this is for all units to use a crystal having the same fundamental frequency. In this case, all units receive the same time in their respective counters except for the error which occurs due to the error in the fundamental frequency of the crystal.

To provide an example of how much the error in the local clock can be, it will be described for a crystal having a tolerance of 100 ppm. This tolerance has the result that, at a maximum, the clock loses 0.1 ms for each second. The comparative units can lose the same amount, which has the result that the total increase in error becomes 0.2 ms per second when a crystal with this tolerance is used. By adjusting the clocks in each unit, they can be made to follow a common time base more closely. A single adjustment has the result that the clock loses 1/10–1/100 of the original error. In this way, the erroneous increase can be reduced to become 2–20 microseconds per second. This means that a system with transferring of the main clock by means of hardware can be provided with a common time within ±5 microseconds or better with adjustment, even if the main clock is only transferred once per second. As is understood from the description, the error in the clocks consists of two errors, one which occurs due to there being a certain uncertainty in the setting of the clocks and one error which occurs due to the clocks losing relative to one another thereafter.

With such a construction, the clocks are provided with the same time with an error between the clocks which, at a maximum, increases at 2 ms per second. By setting the clocks to the same time every second, the error between such clocks can be held to less than 2 ms. If the units have different crystals, a problem also arises, and this is to obtain the same time base in the counters so that the different units can be provided with comparable time indications. To be successful in this case, the units must in some way correct the frequency or the result which is read from the counter. This can be done by the pulses from the oscillator being divided down in some suitable way or by the number in the counter being scaled and transferred to another register where the common time is obtained. For this to function, the different units must be provided with information about the scaling factor which will be used. This can be done in a number of different ways. Either the units have been programmed with the scaling factor which will be used, or this information is transmitted from some other unit. For this to function, certain information about the oscillator frequencies of the units must be known from the beginning. Another method is that the units calculate the scaling factor by utilizing the method of transmitting the time. By transmitting two main clock times, the receiving units can compare the difference between these times with the difference which has been obtained in the internal clock between the two transmitted times. The scaling factor can be calculated by means of these two time differences. The longer the time which elapses between the transmissions, the higher the accuracy with which the scaling factor can be calculated.

The method of giving the different units a scaling can naturally also be used where the units are equipped with the same fundamental frequency. This gives a more general system where the next unit which is coupled to the system can perhaps have a different frequency which must be scaled. Another reason can be that another time base can be desirable, for example that the time will be indicated in seconds.

In modulizing programs and/or control computers, there are difficulties in solving the time problem. In a small computer system, the program sequence can be so small that all possible paths are known and the maximum delay can be determined. In the case of a modularized program which is executed in a 'real-time operating system', there is always some uncertainty with respect to the time at which a program module will be executed. Even if all programs are given priority and sufficient time allocation, only the program or programs with the highest priority can obtain guaranteed access time. The other modules have to wait for different lengths of time depending on how hard the system is loaded by those with the higher priority.

The problem with the time uncertainty of the data in a computer with a real-time operating system is solved simply when there is a common clock in the system. All that is necessary is that all modules which read data also read the time and couple it to the data.

The problem becomes greater when a multiprocessor system is used where each part system uses its own clock. The simplest way to obtain a common time is to drive the clocks by using one and the same oscillator frequency for all clocks. This limits the problem to setting all clocks to one and the same time once the system starts up. After that, the clocks track the common oscillator.

The problem is accentuated if not all units have access to one and the same fundamental frequency. Not only must the time be set when the system starts, but all clocks must be corrected at certain intervals so that the time difference between them does not become too great. In this case the problem first arises of which time is to be applied. One of the clocks must be selected as 'main clock' which provides the time which is valid for the system and which is used to set the other clocks. In a network there can be several main clocks if there are several systems coupled to the network which are independent in time. Another problem to be solved is that the time of the main clock should be transferred in such a way that the other clocks are set to one and the same time with sufficient precision. In most cases, correction of the transmitted time data is required since the transmission time is often greater than the permitted difference.

The above fact requires that, in a system with several clocks, it is clearly determined which of the clocks shall be considered as the right one. In control applications, it is very often not the absolute time which is important, but it is important that the time between two event can be measured with sufficient precision. There is frequently no problem in obtaining the absolute precision, which is why largely any computer clock can be used. The choice of a main clock is therefore most often made on the basis of which module is the 'master' in the system.

The above problem with transferring and setting to the same time can cause some problems since this requires great knowledge of how the transfer of data looks in time. This is because it must be made clear how long a time the transfer of the main clock time takes from the reading of the time by the 'master' to when the receiver receives the time data. The receiver, in turn, must know how long it takes from the reception of the time data to when its clock is set. The time uncertainty in these transmissions directly appears as error between the main clock and the time indication of the local clock.

The present invention provides a possibility of adjusting the time in each unit to one and the same time with high accuracy. This time is then Used to synchronize the reading-in of the data with this common time. With the aid of this time, the unit which is processing data can compensate for the delay and/or variation in the delay which occurs from the reading of the data to when the data is processed in the receiving unit.

The problems are further accentuated when serial data communication is used. Not only are the parts modularized and operate asynchronously, but they will compete with one another for outputting their message on the relatively slow serial communication channel.

To enable a serial communication to be used at all in an open- or closed-loop control system, it must be fast. This is because data can never be obtained more quickly than the time it takes to transfer data. To increase the speed of communication for important data, these must be given preference in a communication system. One way to solve this is for only certain messages to be sent. Another method which results in less system work is that in which each message is provided with a certain priority in the communications system. It is however only the message with the highest priority which has a guaranteed transfer time. All other messages are dependent on how many messages with higher priority there are and how often they are sent (compare with priority in a computer with 'real-time system'). One way to minimize the delays is to make it extremely fast so that a lot of free time is obtained in the communications. However, a faster system becomes prohibitively expensive.

For example, there can be a message which is not directly time critical, which is why it is transmitted with low priority. When this message is transmitted, it can sometimes arrive in 0.08 ms and the next time after 10 ms. It is quite possible to be able to compensate a delay of 10 ms but not a variation between 0.08 and 10 ms. The more messages with higher priority than that to be sent, the greater the spread in the transfer time. This spread and the probability of the transmission of a message occurring within a particular time are based on how often and how many messages of higher priority are transmitted in the communication system.

Irrespective of the solution used, it remains that the receiver cannot determine the transfer time irrespective of the priority of the transferred data. Even the one with the highest priority has a variation in the transfer time depending on whether it is accepted or not and how fast it becomes free.

There are two typical solutions to the problem and the first one is to synchronize the transmissions in the system in some way. However, this will produce a high degree of management effort with regard to what happens in the communication system and a change in a subsystem will in most cases affect all other units coupled to the communication system. This solution is not therefore desirable. The other way is to determine the transfer times which occur. Even if there is no good way to obtain defined transfer times, it is still possible to obtain knowledge on which transfer times apply in each data transmission. This is achieved by each unit being provided with a clock which indicates the time. These clocks are set to the same time, after which the data can be related to this common time.

The problem is to get the clocks to be provided with the same time without introducing further lines in addition to the serial data communication system. If further lines are introduced over and above the communication line, the advantages of serial data communication disappear.

It is possible to implement the time adjustment in all types of serial transmission. However, there is a fundamental requirement which is that the delay of each bit is not too great between transmitter and receiver. In certain cases, it can be possible to compensate for this delay if it does not vary with time. It is also not possible to apply the method if some type of 'spooler function' occurs in the communication system, where the delay in the communication channel is not known in advance. For the types mentioned here where the data communication is used for machine control, the delay is only a fraction of the time which it takes to transfer one bit.

Some different types of transmission shall be mentioned here which can be used with the synchronization method described. For all the communication methods described, the function is optimum if the time handling is built into the communication unit. In many cases, however, a general communication unit can be used in accordance with the method described in the general case. For example, the following principles can be used: random, token, polling, termination with polling, allocation of physical priority and so forth.

The best way to protect the transmission against interferences is to use an optical transmission, but at present it is difficult to use this in a bus communication system and there are only some prototypes and these often at a high price. However, it will be possible in the near future to have several receivers and/or transmitters coupled to one and the same optical conductor. If an electrical transmission method is used, it must be carried out in such a way that the different units connected to the data communication system are galvanically separated from one another. This galvanic separation is usually carried out by means of transformers.

Another method is to use an opto-coupler between the communication line and the units. To obtain a fast transmission frequently requires electronic circuits in the part which is galvanically coupled to the communication line. These electronic circuits can, however, have a separate voltage feed so that the data communication system with communication electronics is galvanically separated from the units which use the communication system.

SUMMARY OF THE INVENTION

According to the invention, the problem is solved by coupling the data to a common time base. Among other things, the invention proposes two ways to achieve time adjustment. Either by transmitting the time at the instant of transmission or by transmitting a message at the exact instant when the clock is set with a predetermined value. In the case of transmitting the time, it is proposed that the time which is transmitted is related to some reference point in the time message so that the receiving unit in turn can set its clock with time data relative to the reference point. Since the setting may be done with the aid of a reset or trigger point (the time is transmitted earlier), the message must also be placed correctly in time so that the trigger point in the transmitted message matches the given time.

To obtain a common time between the units, it must first and foremost be possible to transmit the main clock time in such a manner that all receive the same time. The simplest way to do this is for the transmitting unit to read the clock and transmit it with a message having the highest priority. In this way, the clocks will be set with the same time accuracy as the time accuracy to transmit this type of message. A message in a fast communication system with priority is normally maximized to a length of 120 bits. In a transmission with prioritized communication, the transfer of a time message occurs with an uncertainty of (0–120) divided by the 'baud rate' plus the uncertainty which occurs in the reading of the clock in the transmitter and the inputting of the time in the receiver. When a normal fast communication system with a baud rate of 1 MHz is used, the time is set with an accuracy of approximately ±0.06 ms. For this method to function, the message which sets the time must have the highest priority. The shorter the message the greater the accuracy which can be obtained in the set time. By synchronizing the time message on transmitting and receiving the message, the accuracy can be considerably improved. Transmission can then occur with the same accuracy as the synchronization, which is better than the time it takes to transmit-one data bit. With a baud rate of 1 MHz this will result in a setting error of the time which is less than 1 microsecond. This does not include the errors which can occur internally in the units on reading and setting the clocks. By building in this reading and setting of the time in the hardware of the communication circuit, even greater accuracy can be obtained since all delay times in the hardware can be well determined. With such a method, the setting of the clock can be done with the fraction of the time it takes to transmit one data bit. The greatest error in this case will be the time delays which occur in the communication when one voltage edge is transmitted from the transmitter until it reaches the receiver.

To obtain maximum precision, the setting of the time will be done with reference to an edge in the message which is detected by the hardware in or outside the communication electronic circuits. As described in the text, the time setting can then be effected with better than 1 microsecond at a 'baud rate' of 1 MHz. With a good crystal with a stability of 100 ppm the clock will then have an error greater than this setting of approximately 5 ms. This means that new time information must be sent every 5 ms in order to retain this precision of 1 microsecond. The wholly deciding factor with respect to the precision is how fast the communication system is—the faster the higher the precision. The shorter the time it takes to transmit one bit the faster the information can be transferred on the serial communication system and the higher the precision in time with which the message can be placed in time. The time to transfer one bit, BT, is therefore important for describing the system performance. The other factor is what method is used. The highest error is obtained when the time is transmitted as any message and in this case the same time accuracy is obtained as that which applies to the message transfer. With this method, no great advantage is obtained with time synchronization. By giving the time message highest priority, the time can be transferred with an error which is less than the time to transfer a message. The next step in the refinement is for the time data in the time message to be matched to the instant in time when the data are sent, which provides a precision which is better than the time to transfer 1–3 bits in the communication system. The highest precision is obtained if transmission and reception of time data are carried out by means of special hardware. In this case, the clocks can be set to the main clock time with an accuracy which is better than the time it takes to transfer 1 bit. Depending on the method which is used, the clocks can be set with an accuracy of $\pm 0.1 * BT$ to $\pm 1000 * BT$, preferably $\pm 3 * BT$. On testing a system, the error can be checked by reading the clocks from the different units at the same time via a parallel port at a control unit. This unit can then check that the clocks have adequate synchronism. By regulating the crystals, the time between the time settings can be made less frequent. By transmitting the time with high accuracy in time, the receiving unit can calculate on receiving a second message how much the clock has lost between the transmissions. With the aid of this information, the receiving unit can regulate its clocks in such a manner that their tracking of the main clock is improved. The more accurately the clock is set the greater the importance of the regulating, since the error of the crystal soon has a greater proportion in the error from the main clock than the error which is obtained with the setting.

DESCRIPTION OF THE FIGURES

The invention will be described with the aid of the following drawings, in which.

PREFERRED EMBODIMENTS

In the text below, two illustrative embodiments relating to the transmission of the main clock time in a serial digital data communication system are provided. First, the case is described in which the hardware is adapted to time transmission. The second case describes how the time transmission can be carried out with a general communication circuit and special software. In the first example, the time transmission can normally be carried out more accurately.

Figure 1:
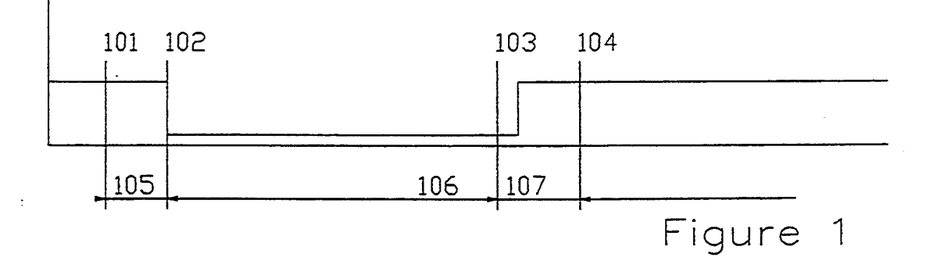
FIG. 1 is a diagram of the transmission of a main clock time as a function of time. The transmitted bits are not marked in the diagram but only the entire message.

In one embodiment it is proposed that the circuit contains certain hardware for handling the clock. This is an attractive solution when the handling is simple since the clock is built into the communication circuit. The reason for this is that it has complete control over the communication and the times which apply in the transmission and which are listed in the text above. The hardware for the communication also has the functions which are required for obtaining transmission of serial messages according to any type of protocol. FIG. 1 shows how the transmission of the time comes about. The communication circuit receives a start command at time (101) which says that a time message will be sent. Thereafter a certain delay (105) occurs which is based on the fact that the circuit must prepare itself for the transmission and it can also take further time if the communication line is occupied. When it has been determined that the time can be transmitted, the circuit reads the internal time and corrects this read time with the time (106) it takes to transmit the message. The time which is transmitted in the message is thus the time which will apply at the time marked by (103). The receiving circuit accepts the message and corrects the message with (107) before the clock can be set. This delay (107) is known from the design and the time represented at (103) is corrected with the delay (107) before the clock is set at the time (104). The time (103) is a well-defined edge in the message which can be indicated accurately except for the delays which can occur in the electrical transmission. With this type of clock setting, the time can be set with a precision which is equivalent to or better than the time to transfer one bit in the communication system.

Figure 2:
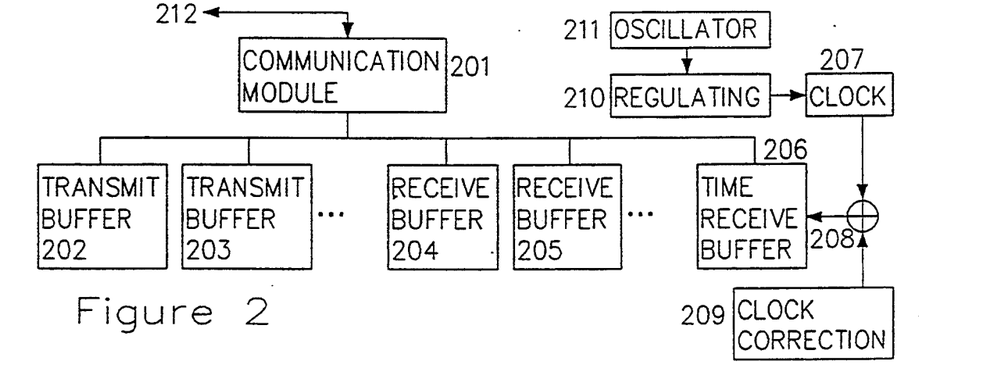
FIG. 2 is a block diagram of the parts which must be present in the hardware which is coupled to the communication line in order to transmit a main clock time with high accuracy in time.

FIG. 2 shows the principle of construction of the communication circuit. This figure does not include all subblocks but only those which are most important to the description of the time function. There is a communications module (201) which ensures that data to be transmitted are taken from a buffer and are transmitted out over the communication channel (212) in a way which is correct for the protocol. The communications module also ensures that the data to be received is accepted and stored in a buffer. This unit will also check that the transmission takes place without errors and, when errors occur, will handle these in accordance with the communications specification. The transmit buffers are marked by (202) and (203) and the receive buffers by (204) and (205), which can contain one or more words with data and commands. Naturally, there can be several such buffers depending on how many messages there are to be accepted and transmitted. If several messages are to be transmitted at the same time, the circuit can first transmit the one with the highest priority with the aid of priority. With one transmit and one receive buffer, with one or a few words, it is sufficient if the circuit can fetch and deliver data to some common memory via DMA (direct memory access) or another technique. However, this method makes it difficult to transmit several messages at the same time. The advantage of sending several messages at the same time is that no coordination is necessary if it is two different subprograms which transmit two different messages. In the case of one buffer, it is necessary for a common program to be available which handles the communication and divides the communication buffer between different demands to transmit. For the time transfer to function, it is necessary that there is a special buffer (206) for the time message, and nothing should be put into this buffer during the time when a time message is to be transmitted. The time message to be transmitted is fetched from a clock (207). Since it takes a certain time from when the time is transferred to when the time message reaches its receiver, the value in the clock must be corrected with a number (209) which is added in (208) to the value from the clock before the time is placed in the buffer (206). The clock time is obtained by calculating pulses from an oscillator (211) which may be crystal controlled. In the case where the clock can be calibrated against a better clock, the pulses from the oscillator can be corrected before they are transmitted to the clock. If the oscillator has too high a frequency, suitable pulses are extracted, and if it is too slow, extra pulses are transmitted to the clock. This regulating of the time is effected with the aid of electronics designated by (210). In the example, it is assumed that the circuit which transmits the time is almost identical with those which accept the time and that the distinction is created by adjusting the circuit in different ways with the aid of softwave and/or hardware. It is therefore possible to correct the clock rate by regulating the basic time, which is obtained from the oscillator, in the same way as in the receivers. This assumes that the 'master' is in some way coupled to an even better clock such as the Telecommunications time signal. In this way, the main clock time can be given a high absolute accuracy.

Transmission, see FIG. 1, is effected in such a manner that the higher-order system indicates (101) to the transmitter that the time is to be transmitted. This can occur automatically after a certain adjustable or fixed time interval by means of equipment built into the hardware or through a signal from external equipment. It can also occur via a program in the computer unit which looks after the communication electronics, which by means of some algorithm can decide when a time transmission is appropriate.

The transmission electronics of the communications module of FIG. 2 (201) will then attempt to get through the communication system. When the priority is determined and/or it is free to transmit a time message, the transmission electronics gives the instruction at time (102) to store the clock value in the buffer with the corrected value. This transfer is fast, one or a few clock pulses, so that the time required from when the command is given to when the data is located in the transmit buffer is not long. After this time, there must be no delay in the transmission. If a disturbance arises, the message must be terminated in such a manner that the partially transmitted information is not utilized by any receiver. When it comes to the point that the time data is to be transmitted, they can be fetched directly from the buffer and serially transmitted in the communication system. At some time in the time message there is a predetermined bit pattern which the receiver recognizes and one of these bits marks occurs exactly the instant in time (103) which is described by the transmitted data, that is to say when this edge arrives at the receiver, the time which is located in the message coincides with the time just received by the main clock (207). It is to obtain this phenomenon that the correction with (209) is carried out before the time is stored in the transmit buffer.

Figure 3:
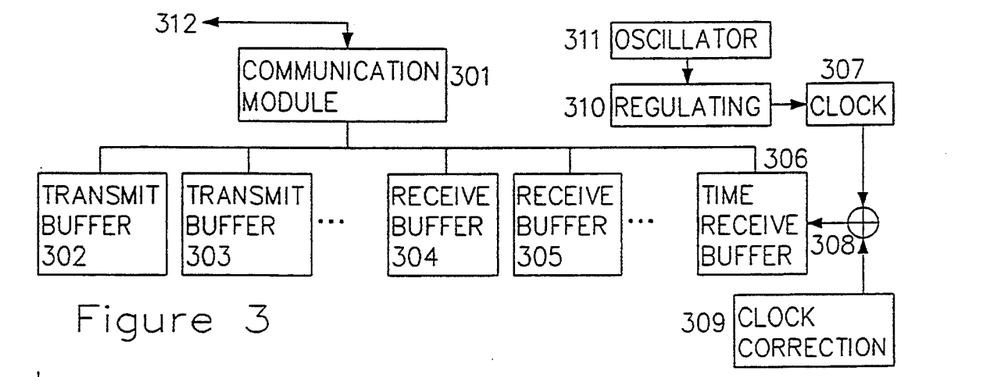
FIG. 3 is a block diagram of the parts which must be present in the hardware which is coupled to the communication line for receiving a main clock time with high accuracy in time.

At the instant when the edge (103) is detected, the clock can be directly updated with the transmitted time. If the time cannot be set directly at this instant, the transmitted time data must be corrected before it establishes a new clock value. Normally, there is a slight delay (107) before the time read in is set to the clock since there is often some delay between the trigger edge and when the message is fully completed. By allowing the message to be completed, it is easier to check that there has not been any error in the information transferred. This checking is done by some type of check sumand/or by the receiver acknowledging that the message has been correctly received. When the time is set (104), the 'master clock' and the time written into the local clock coincide. The construction of the receiver can be almost identical to the transmit electronics. FIG. 3 shows how it can be constructed and the only difference is that in this case the data will go from the buffer to the clock. When the clock is set, the time obtained which corresponds to the time at (103) of FIG. 1 and which is located in register (308) will be added to the content in register (309) which corresponds to the time (107). The result will be that the clock (307) is set to time (104).

Figure 4:
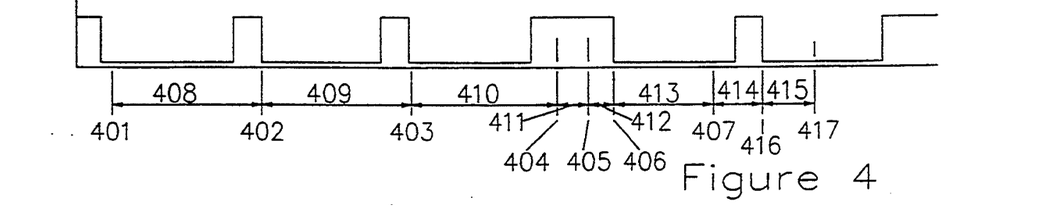
FIG. 4 is a diagram of the transmission of a main clock time as a function of time without the aid of special hardware. The transmitted bits are not marked in the diagram but only the entire messages which in reality frequently have a different or varying length.

The next example describes how the time transmission can be carried out without special hardware. This solution does not require the circuit to be specially arranged for the clock function, but the uncertainty in time becomes greater and it takes quite a long time to carry out the adjustment since it is executed by means of software. FIG. 4 shows how this sequence is carried out in time. For the time adjustment to be carried out accurately in time, two things are required:

a. The one sending the time must be able to transmit a message which prohibits all others from communicating on the line. All receivers coupled to the communication system must follow this command. If the synchronization does not need to be carried out accurately in time, that is to say if there is no resetting of the clocks, but the time is transmitted along as data in the time message, the locking does not need to have the highest priority. The message which locks the communication system, however, must have the absolutely highest priority in order to be able to guarantee that the communication system is locked to a certain time. In the case where the time data accompanies the time message, this is not so critical since it is not so important to know the time in advance, only the time is known at the start of the time message. This message must be available in order to make it possible to transmit the time message at an unambiguous point in time.

b. The lock must be transmitted in good time before the time message is transmitted so that it is 100% guaranteed that the communication system is free at that instant in time.

The proposed solution ensures that the time message reaches its receiver with a predetermined precision. For this to be successful, certain times in the transmission must be known and well determined. These certain times include the following:

The time it takes from when the clock is read until the time message is located in a utilized transmit buffer for transfer.

The time it takes from when the communication circuit gets the command to carry out the transmission until the transmission starts.

The time it takes for transmission to the receiver.

The time it takes for the receiver from when the message arrives until this is signalled to the data processing unit by the communication circuit.

The time it takes from when the unit receives the information about the new time until the clock is set.

The times which are applicable will be different depending on how the solution is effected. In a poor arrangement, there can also be variations in the times which will directly result in an error in the time. FIG. 4 shows how this type of time message is transferred in the communication system. The bits which are transferred have not been marked in the diagram, but the messages with the times (408), (409) and (410) and so forth have only been marked as a block. If the communications are free, the times (408) and (410) will be considerably shortened since these times are extended when other units are transmitting. The time information begins at time (401) and can be compared with (101) when the transmitting unit begins its transmitting phase. Here is shown one of the reasons why this must begin in good time before the time message itself. This is because there is a certain possibility that it is occupied (408) in the communication system by another message in the communication system. When this. message is finished, the locking message can be sent (409) if this message has the highest priority. This locking takes a certain time to be cleared by the receiving units, which is why there is a high risk that some other transmitter has been waiting to and has begun its transmission (410) before the locking has been detected. Before the message can be transmitted, it must be determined that the communication system is free before transmission starts, which is why a safety margin (411) is included. After that the transmitting frequency begins (405) with the readout of the clock, to this value will be added the times (412) and (413) which is the time taken to transfer the information to the receivers. The time (412) is based on the time it takes for the software to read out the clock, correct the time and place this data into the communication circuit. The time (412) is also based on the time it takes from when the communication circuit receives the transmit command until the message is output on the communication line. These times must be measured in the programming and the software and hardware must be such that this time (412) will be constant or with an ensured accuracy. The reason why all other communication must be stopped is that the communication system is free at time (412) yet nobody may begin to send. If somebody should begin to send, the time (412) could vary quite a lot. At time (413), the information is transmitted to all receivers. A certain time (407) in the transmission is coupled to the time found in the message. It must be possible to relate this point with the time of all receivers. As soon as the message is detected by the communication electronics of the receiver, an interrupt must start a program (417) which deals with the time message. The time (414) which elapses between the trigger point in the message and the point when the program starts must not vary more than a particular value. This entails that the communication hardware must provide an interrupt after the message has arrived without variations in time. This interrupt must be processed by the processor without delay or by measuring the delay in such a manner that a compensation can be introduced later. The important thing is, however, that the time between (407) and (417) is known. The software which starts at (416) will add to the time message the times (414) and (415) so that the local clock is given the correct time relative to the main clock when it is set at time (417).

The clocks of the units can be made to track one another more closely by regulating them. Regulation can be carried out, for example, in one of the following ways:

1. Reducing or adding pulses from the oscillator with one or several different intervals.
2. Adding one or different numbers directly to the clock with different intervals.
3. Adding a precalculated number to the clock by means of a special program with certain intervals.
4. It can also be carried out in such a manner that the clock is allowed to go wrong and that, before the time is sent, a scaling of the value in register (209) is carried out. However, this requires that the clock is corrected internally before being used or that it is read via the time buffer.

In the case with one or several intervals, these can be fixed or those with equal spacing are corrected by some computer program in order to obtain better regulation. A suitable combination of the above solutions will probably be used. The more accurate the time adjustment the more complicated an algorithm must be used.

Figure 5:
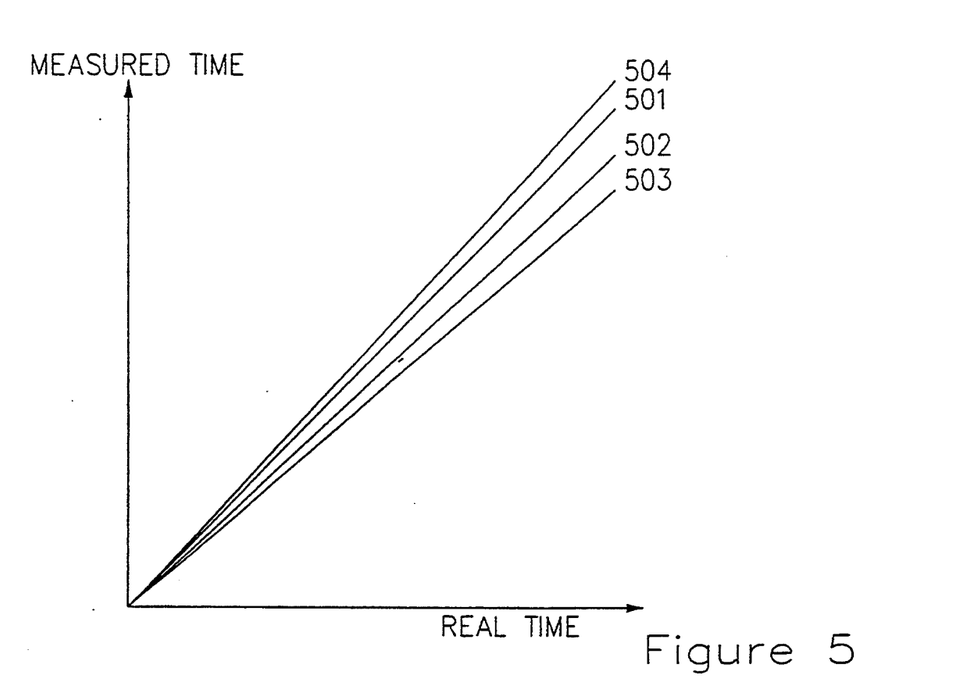
FIG. 5 describes how the clocks of the different units can diverge apart when they d6 not run accurately.
Figure 6:
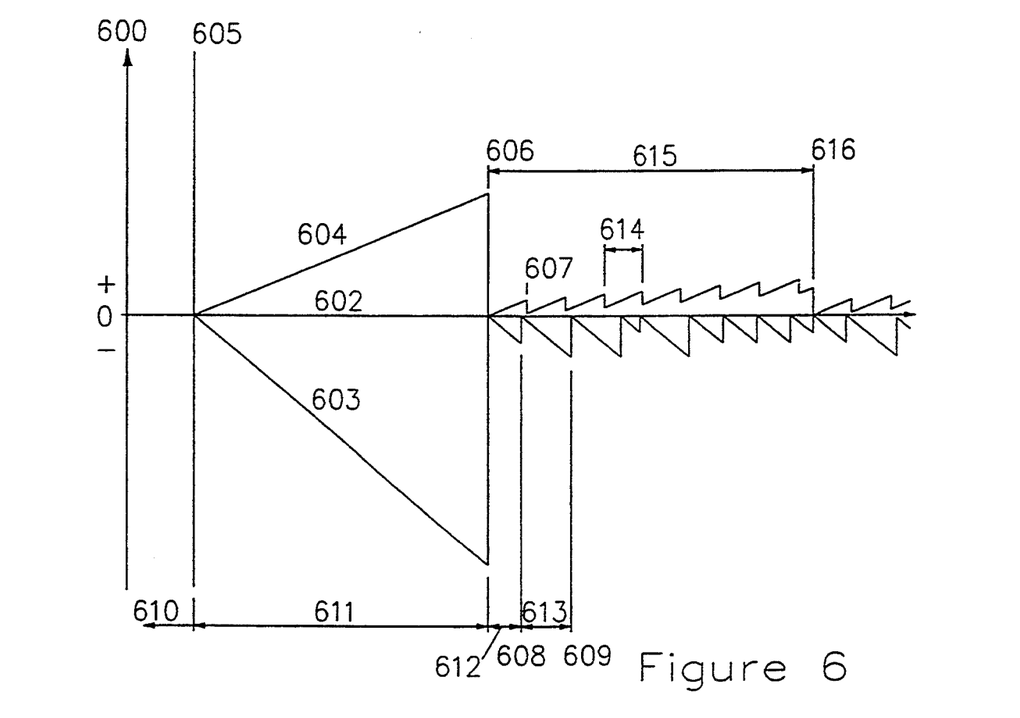
FIG. 6 describes how two clocks diverge from the main clock's correct time and how they can be made to follow the main clock's time in an improved manner by setting and regulating these clocks.
Figure 7:
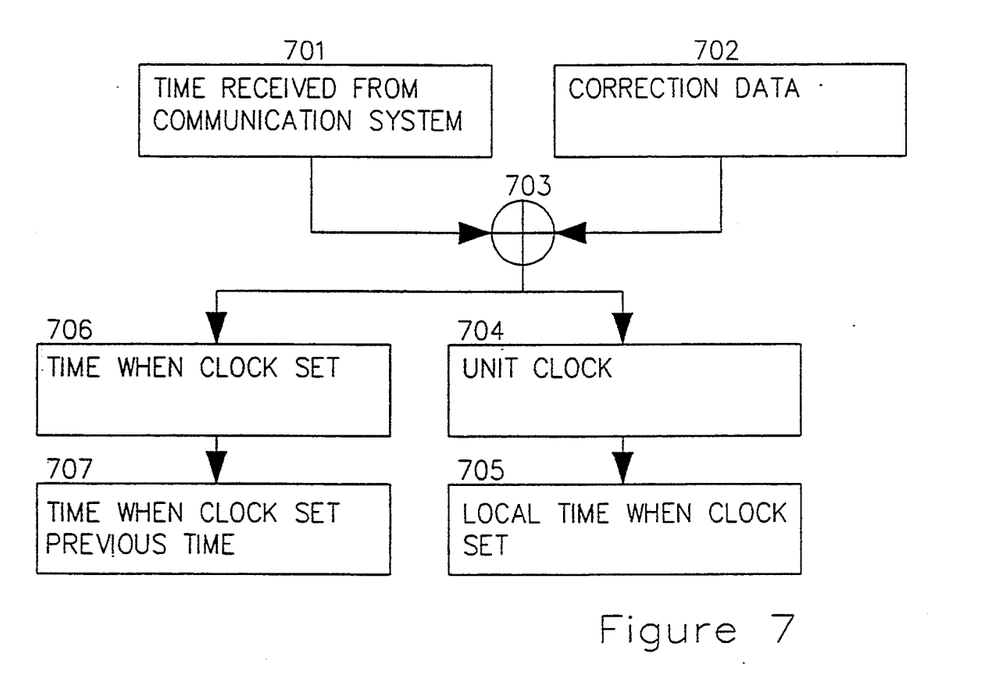
FIG. 7 describes a setting-up of registers which can be used for obtaining at the receiver the information which is required for regulating the clocks in a correct manner.

To be able to regulate the clocks, the invention assumes that certain data are available for calculating by how much the clock will be corrected. FIG. 5 shows how the time increases in different clocks in which an accurate clock (501) has also been provided as reference. If a better absolute time is desirable, the 'master' clock (502) can be regulated in such a manner that it tracks the correct absolute time (501) more closely. FIG. 5 is transferred to FIG. 6 where the difference from the main clock (502) is specified in the diagram. Considering the main clock (602), this will be correct when it is provided with a time error (600) of zero and therefore follows the zero line. The diagram begins at time (605) when all clocks are set for the first time. Before this time (610), the clocks can have any time whatever. Afterwards, as time progresses (611), the other clocks will deviate more and more from the time in the main clock. This deviation is mainly linear due to the stability of the oscillating circuits. The next time (606) when the 'master time' is transmitted, the remaining units can calculate how much error the clocks have made since they have last been set. The units can use this calculated error to correct the rate (607, 608, 609) of the clocks in such a manner that they more closely track the time of the 'master clock'. To carry out this calculation, it is presupposed that two things are known. The difference between the time which the unit had when it was set and the time which the clockwise given and the time back to the earlier setting, that is to say the time which was required to obtain the error plus the magnitude of the error. FIG. 7 shows an example of a function block and register which can be used for obtaining the necessary information directly in the hardware. It is also possible to carry this out by means of software but this requires good knowledge of how long it takes to execute the necessary instructions. Uncertainty in these times will be directly apparent as misadjustment of the time. Compare with the transfer of the time. In the hardware it is possible to carry out the functions with a high accuracy. After the second time message, a new time message can be produced less frequently since the error in the clock only occurs as a result of rounding errors and the non-linear part of the time error which is shown in the curves in FIG. 6.

An example follows of a hardware configuration for obtaining in the simplest way all necessary data directly when the clock is set. This first example describes how information for correction can be obtained in the electronics in the communication circuit which sets the clock.

FIG. 7 shows the registers with clock data which are used for setting the time. In order to be able to utilize the information, it must be possible for most of these registers to be read by the higher-priority unit. The one marked by (701) is the register which holds the time transferred by means of the communication system, which compares with (306) in FIG. 3. The correction register (702) contains the value by which the transmitted time will be corrected. The value in the register is the difference between the time at the trigger point in the message and the time which applies when the internal clock (704) is set. When the clock is set, the value in (701) and (702) will be added to one another in the summing circuit (703) after which the result is used for setting the clock (704). At the same time, this value is saved in register (706) and the one which was earlier located in (706) is transferred to (707). At that instant when the clock is set, the earlier clock value is transferred to a register (705). This is only one example of a configuration; naturally there are other ways of obtaining the necessary information.

The first thing which is done in accordance with the invention is to obtain the time when the clock was set, which in this case is stored in (706). This is obtained by adding the content in (701) and (702) which occurs when the clock is set. To have something to refer to, this value is called 'CLOCKSET' (706). The value which was obtained at the preceding clock setting and which earlier was stored in (706) is transferred to (707). By taking the difference between (706) and (707), the time between clock settings can be obtained and this value is given the symbol name 'RUNTIME'. By subtracting the value in register (705) from the value in (706), 'CLOCKERR' is obtained which indicates how much the local clock has lost during the 'RUNTIME' time. By calculations with 'CLOCKERR' and 'RUNTIME' it can be calculated how often the clock will be corrected and how large the correction should be. These calculations must take into consideration the corrections which have been calculated earlier at (606) and which were used for correcting the clock in the 'RUNTIME' time (615). Naturally, these corrections affect the result of 'CLOCKERR'. In other words, when a time from the main clock is obtained at (616), a different calculation must be used than when it comes after the first time (606). The correction can then be carried out internally with a constant interval in time (614) or with different time intervals (612, 613). Calculating and correcting can be built into the clock's hardware or done by means of software. A combination of these two methods seems to be the most common. The times, (611, 615) between transmission of the main clock can be constant or vary with time.

In the same way as it is possible to carry out the time setting by means of software, these data can be fetched by means of software. However, the problem remains that it takes time to execute a program. These execution times must be known in order to be able to precalculate the right data.

With a cold start, before (605), there is no reliable value in (706, 707) which means that no calibration can be carried out at that time. This entails that a start-up routine must be found for the clock in order to set the clock the first time. When the system starts, the time is not known at all since it is rarely possible to determine when it starts relative to the main clock.

Neither can any data be transferred in this period since their time cannot be determined. At the least, the data must be treated in a completely different way in this period. This is not an unusual problem since all systems must be started up in some way and the synchronization can be included in this as a part.

The same problem arises if the main clock is to be reset. In this case, however, the problem can be managed since the magnitude and time of the resetting can be transferred to all units. The different units can then correct all times to the new time before they are used for coupling the data in time.

Figure 8:
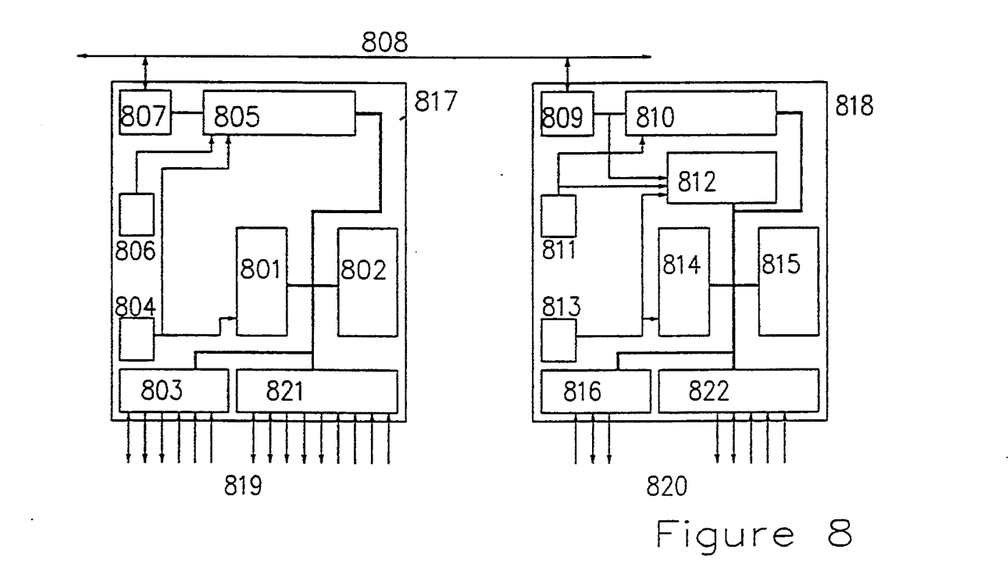
FIG. 8 describes two units connected to a serial communication system and which are equipped in such a manner that the time message can be transmitted between the units.
Figure 9:
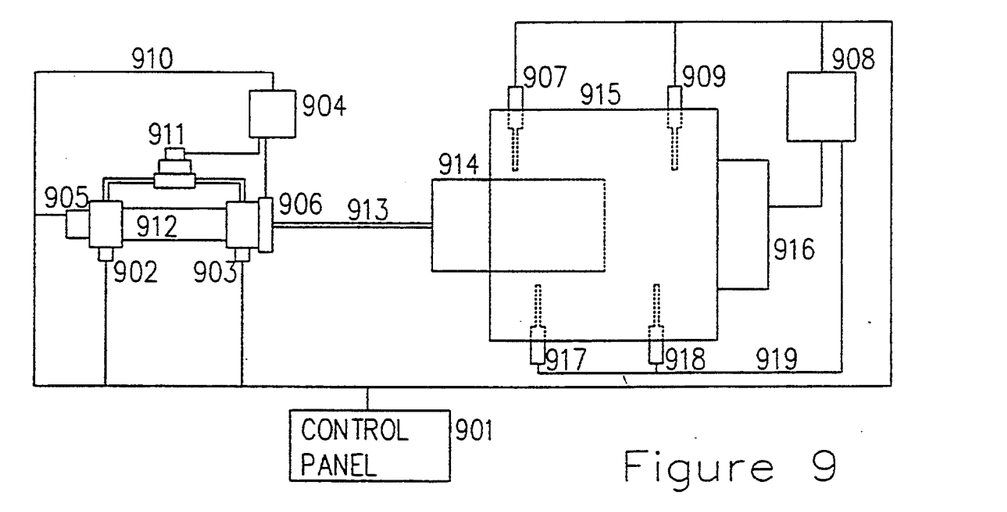
FIG. 9 shows a control system in which the invention is used for simplifying and improving the system performance.

FIG. 8 describes two units coupled to the communication system, for example (904) and (908)of FIG. 9. These consist of a processor (801, 814.), memory (802, 815), interface (803, 816, 821, 822), an oscillator (804, 813), serial communication circuit (805, 810) and an interface (807, 809) to the communication system (808). The unit (817) differs from (818) by having two oscillators (804, 806) coupled to the communication circuit, one being used for the clock and the other for keeping synchronism in reading-in and -out during communication. The unit (818) uses the oscillator (811) for serial communication. In this case, special hardware (812) coupled to the communication line is used for reading-in the clock. This method can be used when the unit (810) does not have any equipment for handling the clock and when full control of the clock setting is desired. The hardware (812) can also contain such electronics which support the software with times so that the setting of the clock can be effected with high precision in spite of the uncertainty of the software. It is possible to use an oscillator for all functions on the card. In most cases, the units are equipped with inputs and outputs (819, 820) for coupling to the environment which the unit will control or read. In the case of unit (908), two communication units are connected. In this case, there must also be a setting-up of interface (807) and a communication circuit (805) in order to clear this channel.

Figure 10:
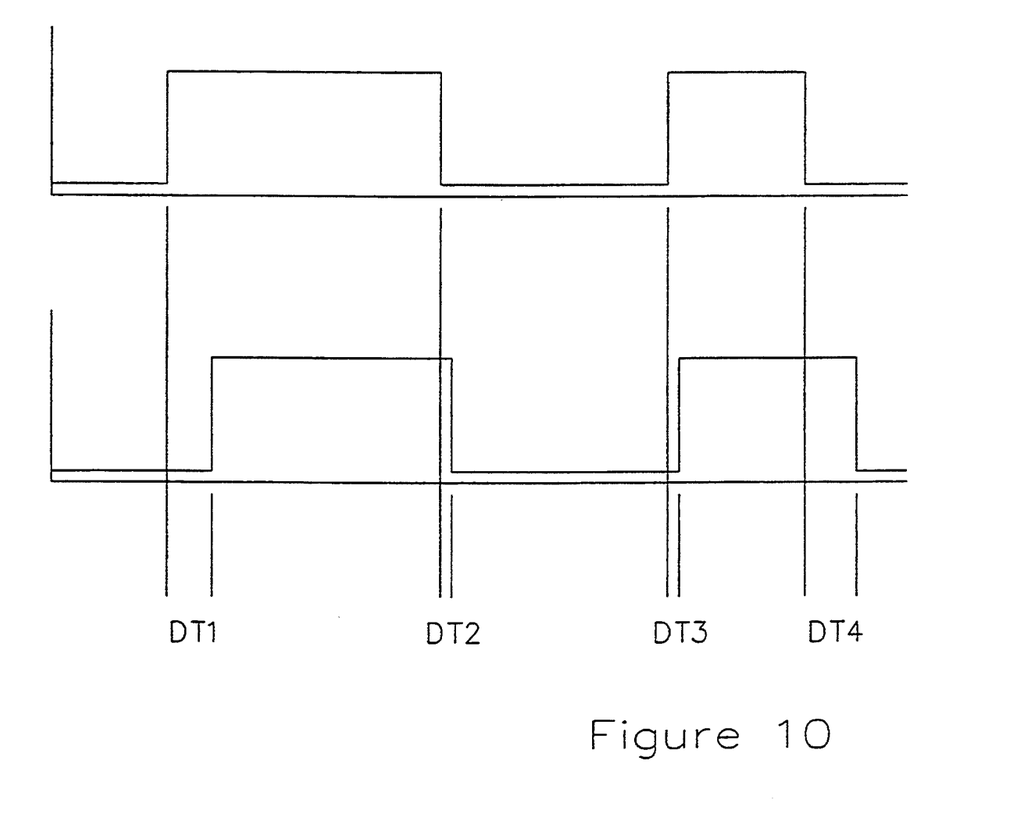
FIG. 10 shows how an event in time is distorted when it is transmitted with undeterminable and varying times to another unit.

FIG. 10 shows how the transmission of data with time information can improve the information transmitted. The upper curve shows how an event occurs in a unit and the lower one shows how this is reflected when it is received in the receiver. By the time of the event being transferred with the event and both units having clocks which are set to the same time, the receiving unit can calculate the delays DT1-DT3 and compensate for these. For this to function, it is required that the clocks in all units give the same time with an error which is considerably less than the delays DT1-DT3 which will be calculated.

The system in FIG. 9 consists of an hydraulic cylinder (912) which is controlled by the control unit (904) via the control valve (911). The position sensor (905) and pressure sensors (902, 903) are used for feedback. In this case, it is thought that the piston (913) of the hydraulic cylinder can be locked with the brake (906). The object (914) is heated in the furnace (915) which is controlled by the control unit (908) via a drive stage (916). Temperature sensors (907,909) are coupled to the control unit (908) via communication line (910) and the sensors (917, 918) are connected via the communication system (919). A control panel (901) is also connected so that an operator can control the system. He can read the units or give new control commands via the communication line (910).

All units connected to the communication channel have equipment to be able to transmit the information in accordance with the protocol applicable to the communication system.

This equipment according to FIG. 9 is used for positioning an object in a furnace. To carry out this positioning quickly and accurately, the cylinder (912) is also equipped with two pressure sensors (902, 903) besides the position sensor (905). In order to get the hydraulic cylinder to stand still, it is equipped with a brake (906).

The control equipment (908) controls the output of the furnace so that the desired temperature can be obtained. When a new cold material (914) is to be introduced into the furnace via the hydraulic cylinder (912), the furnace regulator is provided via the communication system with information about the body's appearance and temperature of this unit so that a regulator can be optimized with respect to these particulars. Four temperature sensors (907, 908, 917, 918) are used for controlling the temperature. These sensors are arranged in such a manner that they only send the temperature values when the temperature changes by a preset value. In this manner there is no unnecessary information transfer. To control the temperature in a furnace is a relatively slow process which means that the temperature transmissions can occur at long intervals. In short, the problem in regulating a furnace consists in taking into consideration the delay times which apply in the system. By analysing the system, a model can be created which can then be used for obtaining good regulation of the furnace output. For this regulation to function well, the correct input data must be obtained, that is to say the temperature read and its position in time must be accurate and the weight, appearance and heat capacity of the body introduced in the furnace must be well determined.

In this case the positioning is not continuous, but the positioning is effected over a short time after which the position is locked with (906). The positioning will be carried out with high accuracy which means that large amounts of information must be transferred from the sensors (902, 903, 905) which are used in the positioning. These pressure and position data therefore have high priority. It is here assumed that this volume of information is so large that it locks up the entire communication system, that is to say the furnace cannot obtain any temperature data during positioning. However, this does not matter since the positioning occurs within such a short time that the temperature data is not unnecessarily delayed. However, variation in the delay can produce a problem in the modelling since the temperature data does not keep adequate accuracy in time. In this system where there is a common time in the system, the temperature is followed by a time information which means that the control unit can place the temperature data correctly in time. By this means, a correct calculation can be carried out and good temperature control obtained.

If the system had not had a common clock, it would have been necessary to introduce two different communication loops, one for the furnace and one for the positioning. It would also have been necessary to equip the system with a further communication system for coupling the two adjusting units to the common higher-priority control. unit. This would also require a communication port in the adjusting units. It would also be necessary for the position regulator to transfer position data to the furnace control via the second communication line, which data in our case could be obtained only by reading the data traffic from the position sensor to the position control.

The invention is not limited to the illustrative embodiments specified above but can be modified within the context of the following patent claims and the concept of the invention.

I claim:

1. A system for synchronizing clocks of a plurality of communication units which are interconnected to a common communications channel for sending and receiving messages having different priorities to each other comprising:

means for transferring over said common communications channel a message of a predetermined priority for synchronizing the clocks which contains a serial bit pattern marking a reference time, and data identifying the reference time, wherein the synchronizing message competes with other messages having said different priorities for being transferred over said common communications channel;

means at each of said communication unit for decoding said received message and detecting said serial bit pattern to identify said synchronization message, and determining from said data within said synchronization message a clock time for a local clock of a respective unit; and, means for setting said local clock to a time identified by said serial bit pattern and said data.

2. The system of claim 1, wherein one of said communication units serves as a master clock unit and includes:

means for generating said synchronization message having said serial bit pattern and said data; and, means for applying said synchronization message to said common communication channel with a priority greater than any other message.

3. The system of claim 2, wherein the time difference between said master clock and the clocks of the remaining communication units is maintained at a value which is less than a time uncertainty of a message transferred over said communications channel.

4. A system of claim 3 wherein said time uncertainty is then the bit time of a plurality of message bits on the communication channel.

5. The system of claim 1 wherein said communication units generate sensor data from a sensed event which includes a time reference, and transmits said sensor data and a local time reference over said common communications channel.

6. A system of claim 5 wherein said data is corrected or rejected by a receiving communication unit depending on the difference between the time reference connected to the data and the actual time in the local clock of a receiving unit.

7. A system of claim 5 wherein said data of said synchronization message is used to change other data generated by said communication units depending on the difference between the time reference included with said sensor data and the actual time of a communications unit local clock.

8. The system of claim 1 wherein each communication unit processes said data from messages received from said communication channel, and corrects said data to account for time spent processing said data, and stores said corrected data in a time receive buffer.

9. The system of claim 8 wherein each communication unit corrects said data to account for time spent recognizing said serial bit pattern and the actual time of storing said corrected message in said time receive buffer.

10. The system of claim 1, wherein said plurality of communication units have clocks which are maintained to have a time difference within a predetermined value, each clock being controlled by an oscillator which is not synchronized with an oscillator of another communication unit, said communication unit including means for resynchronizing a respective clock in response to receipt of said serial bit pattern and said data wherein said time difference between clocks is reduced below said predetermined value.

11. The system of claim 10, wherein each communication unit includes means for inserting additional pulses or removing pulses from said oscillator in response to said synchronization message.

12. The system of claim 10 wherein each communication unit includes means for calculating the local time difference between two of said serial bit patterns and means to calculate the difference between two global clock times for said serial bit patterns, and means to compare said differences with a time difference between the local time of a communication unit and a received global time.

13. The system of claim 12, wherein each communication unit includes means for inserting additional pulses or removing pulses from an oscillator of a local clock in said communication unit in response to the comparison of said local time difference and said global time difference.

14. The system according to claim 1, wherein each communication unit comprises:
 a register for storing a time correction value;
 means for inserting a time correction value in said register based upon a received synchronization message; and,
 means for correcting a time produced by said clock with said time correction value.

15. The system according to claim 1 wherein said data identifying the reference time is sent over said communication channel following transmission of said serial bit pattern.

16. The system according to claim 1, wherein said serial bit pattern and said data occur in a single message in the same frame.

17. The system of claim 1, wherein each communication unit receives commands over said common communication channel which are executed at a specified local time reference.

18. The system of claim 17 wherein said commands include the time it will be executed referenced to a local clock of a receiving communication unit.

* * * * *